Nov. 22, 1955  A. S. FRIEDMAN ET AL  2,724,571
ADJUSTABLE ARTICLE SUPPORT
Filed Jan. 30, 1953
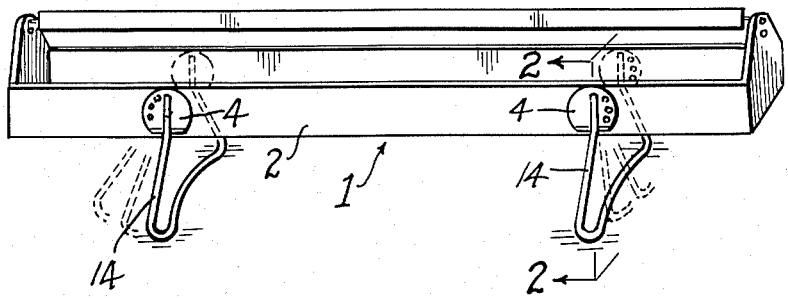
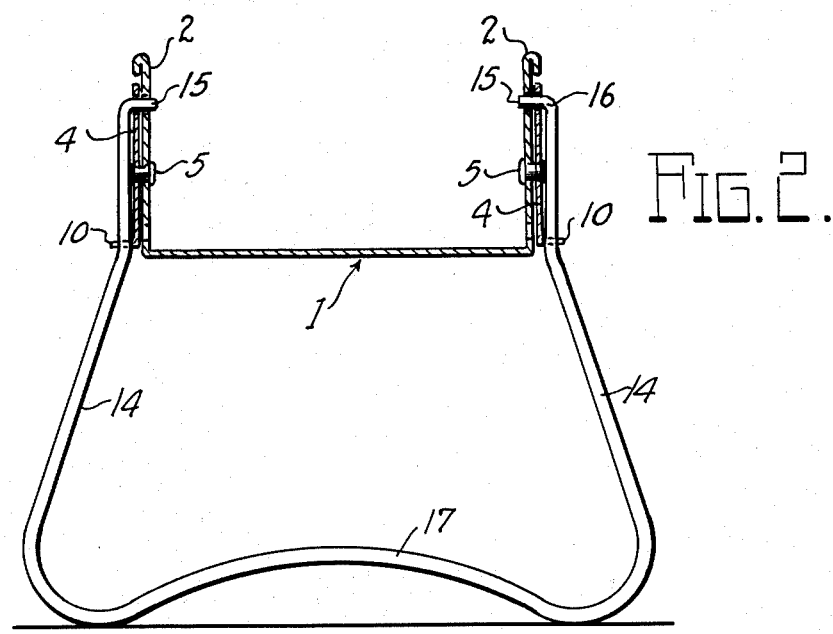
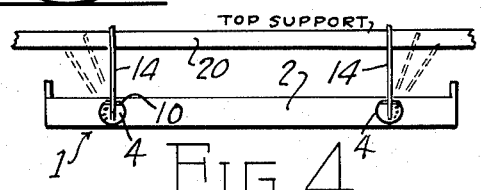
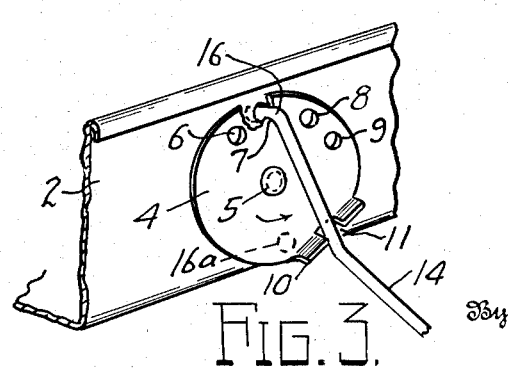
Inventor
Abraham S. Friedman
William C. Compton
By Owen & Owen
Attorneys

United States Patent Office 2,724,571
Patented Nov. 22, 1955

2,724,571
ADJUSTABLE ARTICLE SUPPORT

Abraham S. Friedman and William C. Compton, Hicksville, Ohio, assignors to The National Ideal Company, Toledo, Ohio, a corporation of Ohio Application January 30, 1953, Serial No. 334,252

4 Claims. (Cl. 248—151)

This invention relates to adjustable mounting means for various articles, and is particularly intended for use in connection with poultry feeders, but is not restricted to such use.

In the use, for instance, of poultry feeders, it may be desirable to vary the height or elevation of the feeder to suit the size of the poultry or other conditions of use, and it is, therefore, the object of this invention to provide a novel and improved support for the article which is simple, strong and economical in construction and is capable of easy and quick adjustment to suit its purpose.

Further objects and advantages of the invention will be apparent from the following detailed description, and from the accompanying drawings showing one form of the invention, and in which—

Fig. 1 is a perspective view of the invention applied to a poultry feeder;

Fig. 2 is an enlarged cross-section thereof on the line 2—2 in Fig. 1;

Fig. 3 is an enlarged fragmentary detail of Fig. 1 with the mounting means in a different position of adjustment, and with a part broken away, and Fig. 4 is a side view of a feeder and top support with the mounting means adjusted to suspend the feeder from a top support.

Referring to the drawings, 1 designates a poultry feeder having opposed side walls 2, 2 to which the mounting means constituting the invention are attached. Such mounting means may comprise a desired number of units, usually two, spaced lengthwise of the feeder and preferably placed one adjacent to each end.

Each unit, in the present instance, includes two disks 4, 4, each rotatably attached to a respective side wall 2 of the feeder at the outer side thereof by a pivot 5, and each is provided near its outer edge with a segmental series of holes arranged concentric to the pivot axis and shown, in the present instance, as four in number and designated 6, 7, 8 and 9. Each disk is also provided at the opposite side of the pivot to some of said holes with a leg holding means comprising, in the present instance, an outward projection 10 forming a loop or recess 11.

Cooperating with each disk 4 is a leg or support member 14 that passes through or is engaged in the respective loop or recess 11 and has its inner end extending across the disk and provided with an inturned stud 15 that projects through one of the disk holes 6, 7, 8 and 9 and into a bearing hole or receiving means 16 in the feeder side wall with which it registers. This hole 16 is located above the pivot 5 as shown.

The outer ends of the opposed legs 14, 14 of a unit are preferably connected by an integral cross member 17 so that the feeder support is in the form of a bail with the legs normally sprung inwardly to a width less than that of the feeder. The legs of a pair are thus normally sprung into the respective recesses 11 with their end studs 15 engaged in a disk hole and in the registering wall hole 16.

When the legs 14 are in vertical position the studs 15 are engaged in the hole 6 of the two disks 4, such holes being disposed in the same diametrical line as the pivot 5 and recess 11. To adjust the support to lower the feeder, the leg studs 15 are withdrawn from the holes 16 and the respective disk holes 6, and the disks are then turned to place the desired disk holes 7, 8 or 9 in register with the respective holes 16 in the feeder side walls. The end studs of the legs are then engaged in the registering disk and wall openings and the leg shanks engaged in the recesses 11, thus locking the legs in inclined supporting position, as is apparent. The disk holes 7, 8 and 9 may be placed in any desired relation to each other and to the holes 6 in order to obtain the desired adjustment of the legs for any hole when moved into register with the locking holes 16 in the feeder walls. For instance, a first position of adjustment may be obtained when the holes 7 are in register with the holes 16; a second position of adjustment obtained when the disk holes 8 are in register with the holes 16, and a third position of adjustment obtained when the disk holes 9 are in register with the holes 16.

If desired to suspend the feeder from a top support 20, the disks 4 of each unit may be given a half turn so as to dispose the recessed member 10 at the top portion of the feeder with the disk holes 6, 7, 8 and 9 adapted to be placed in register with a locking hole 16ª in the lower portion of the respective feeder side. The legs 14 then extend upward instead of downward from the feeder and may be rigidly suspended from the top support 20 in any position of adjustment, as shown in Fig. 4.

We wish it understood that our invention is not limited to any specific construction, arrangement or form of the parts, as it is capable of numerous modifications and changes without departing from the spirit of the claims.

What we claim is:

1. A support for an article having a vertically disposed wall with a stud-receiving opening therein, said support comprising a disk mounted on said wall to turn about an axis spaced from said opening and having a series of holes disposed concentrically around said axis and selectively movable into register with said opening by a turning of the disk, a supporting member turnable with said disk and having an end stud engageable through a selected one of said disk holes and into said opening to hold the disk in a predetermined position of rotary adjustment, and means on said disk in outwardly spaced relation to its turning axis and engageable with the supporting member in spaced relation to the engaged hole to cooperate with the hole to hold the support member in predetermined relation to the disk.

2. A support for an article having a vertically disposed wall with a stud-receiving opening therein, said support comprising a member mounted on said wall to turn about an axis spaced from said opening and having a series of holes disposed concentrically around said axis and selectively movable into register with said opening by a turning of the member, a notched lateral projection on said member in spaced relation to said series of holes and to the member axis, and a downwardly projecting part turnable with said member and having an end stud engageable through a selected one of said member holes and into said opening to hold the member in a predetermined position of rotary adjustment and also having a portion engageable with said notched projection to cooperate with the engaged member hole to hold the support in predetermined relation to the member.

3. A support for an article having opposed vertically disposed side walls with a stud-receiving opening in axially aligned position in each wall, said support comprising a disk mounted on each side wall to turn about a common axis spaced from its said opening, said disks each having a series of holes disposed concentrically around said axis and selectively movable into register with the respective stud-receiving opening by a turning of the disks, a bail-like member having legs with the inner end portions thereof extending across the outer sides of the respective disks and having studs at their inner ends projecting through said holes in the respective disks and into the registering stud-receiving openings whereby to lock the disks against turning, and means on the disks engaging the respective member leg to hold the support in predetermined angular relation to the article when said member studs are engaged in said stud-receiving opening.

4. A support as called for in claim 3 wherein the legs of the support normally spring inward to project their studs through the disk holes and into the registering receiving means.

References Cited in the file of this patent

UNITED STATES PATENTS

| | | |
|---|---|---|
| 579,493 | Nelson | Mar. 23, 1897 |
| 1,363,664 | Livingston | Dec. 28, 1920 |
| 1,598,931 | Patche | Sept. 7, 1926 |
| 1,874,498 | Glenny | Aug. 30, 1932 |
| 2,020,551 | Hill | Nov. 12, 1935 |
| 2,308,701 | Martin | Jan. 19, 1943 |
| 2,309,772 | Karger | Feb. 2, 1943 |